US012621168B1

(12) United States Patent
Schultheiss et al.

(10) Patent No.: US 12,621,168 B1
(45) Date of Patent: May 5, 2026

(54) CONNECTOR FOR PRIVATE CERTIFICATE AUTHORITY AND DIRECTORY SERVICE

(71) Applicant: Amazon Technologies, Inc., Seattle, WA (US)

(72) Inventors: Kyle Benjamin Schultheiss, Centreville, VA (US); Daniel Jiyoung Choi, Reston, VA (US); Divyansh Gupta, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 18/478,699

(22) Filed: Sep. 29, 2023

(51) Int. Cl.
*H04L 9/32* (2006.01)

(52) U.S. Cl.
CPC .......... *H04L 9/3268* (2013.01); *H04L 9/3226* (2013.01); *H04L 9/3265* (2013.01)

(58) Field of Classification Search
CPC .... H04L 9/3268; H04L 9/3226; H04L 9/3265
See application file for complete search history.

(56) References Cited

U.S. PATENT DOCUMENTS

| | | | | |
|---|---|---|---|---|
| 10,805,091 | B2 * | 10/2020 | Rai ....................... | H04L 9/3268 |
| 2017/0346848 | A1 * | 11/2017 | Smith ..................... | H04W 4/70 |
| 2021/0288822 | A1 * | 9/2021 | Sorensen .............. | H04L 9/0877 |
| 2024/0146543 | A1 * | 5/2024 | Sahoo ................... | H04L 9/3271 |

* cited by examiner

*Primary Examiner* — Hany S. Gadalla
(74) *Attorney, Agent, or Firm* — BakerHostetler

(57) ABSTRACT

A method includes receiving, by a service operating in a provider network comprising a plurality of tenants, a request from a user device of one or more user devices in a user VPC of a first tenant of the plurality of tenants, wherein the request includes service identity information and authentication information. The method also includes providing, by the service, the request to an intermediary service operating in the provider network, wherein the intermediary service associates the service identity information with information maintained by the intermediary service associated with the tenants, and authenticating, by the intermediary service and with a domain controller, the request based on the authentication information. The method further includes, after the request is successfully authenticated, generating, by a private certificate authority (PCA) in a service VPC separate from the user VPC, a certificate based on the request, and providing the certificate to the user device.

20 Claims, 9 Drawing Sheets

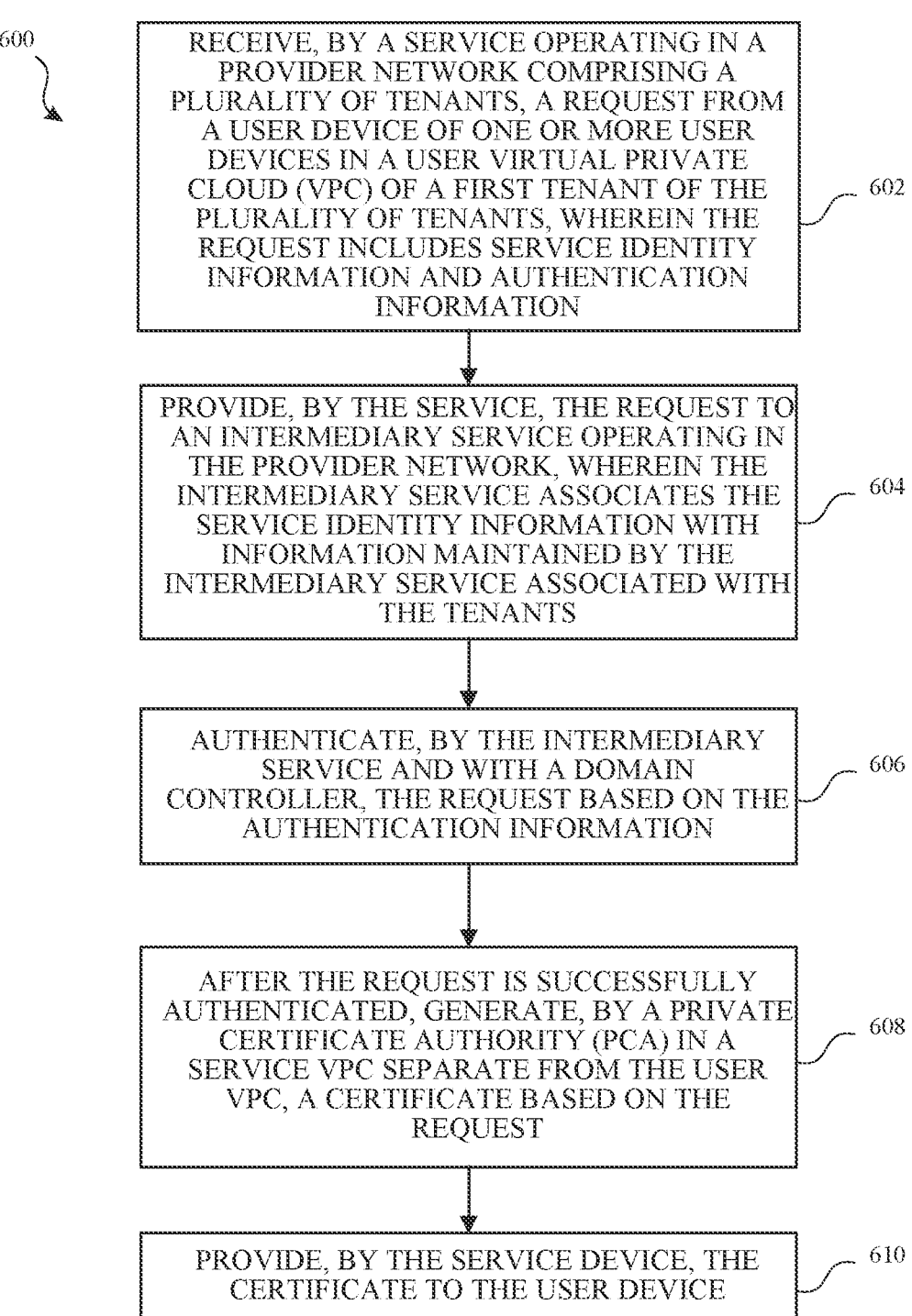

600

602 — RECEIVE, BY A SERVICE OPERATING IN A PROVIDER NETWORK COMPRISING A PLURALITY OF TENANTS, A REQUEST FROM A USER DEVICE OF ONE OR MORE USER DEVICES IN A USER VIRTUAL PRIVATE CLOUD (VPC) OF A FIRST TENANT OF THE PLURALITY OF TENANTS, WHEREIN THE REQUEST INCLUDES SERVICE IDENTITY INFORMATION AND AUTHENTICATION INFORMATION

604 — PROVIDE, BY THE SERVICE, THE REQUEST TO AN INTERMEDIARY SERVICE OPERATING IN THE PROVIDER NETWORK, WHEREIN THE INTERMEDIARY SERVICE ASSOCIATES THE SERVICE IDENTITY INFORMATION WITH INFORMATION MAINTAINED BY THE INTERMEDIARY SERVICE ASSOCIATED WITH THE TENANTS

606 — AUTHENTICATE, BY THE INTERMEDIARY SERVICE AND WITH A DOMAIN CONTROLLER, THE REQUEST BASED ON THE AUTHENTICATION INFORMATION

608 — AFTER THE REQUEST IS SUCCESSFULLY AUTHENTICATED, GENERATE, BY A PRIVATE CERTIFICATE AUTHORITY (PCA) IN A SERVICE VPC SEPARATE FROM THE USER VPC, A CERTIFICATE BASED ON THE REQUEST

610 — PROVIDE, BY THE SERVICE DEVICE, THE CERTIFICATE TO THE USER DEVICE

*FIG. 6*

CONNECTOR FOR PRIVATE CERTIFICATE AUTHORITY AND DIRECTORY SERVICE

BACKGROUND

Some directory environments rely on a dedicated certificate services server role to provide autoenrollment for directory-joined users and computers. Customers may be required to either run the role themselves or can opt to pay for a third-party-managed certificate authority (CA) service (e.g., private CA). Users who choose to run the service themselves may encounter licensing fees as well as other hidden costs in terms of operation including costs for staff, configuration, maintenance, patching, server hardware, backup, disaster recovery, and secure hardware for protecting cryptographic secrets. Running a private CA securely may involve complex security work that is time-consuming, easy to get wrong, and requires teams with specialized talent. Users who lack the expertise to handle all of these tasks therefore may choose to outsource CA operations and expertise to consultants and legacy managed CA service providers at an even higher cost.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates a flow diagram of an exemplary process for issuing a certificate, in accordance with one or more embodiments of the subject technology.

DETAILED DESCRIPTION

The description set forth below describes various configurations of the subject technology and is not intended to represent the only configurations in which the subject technology may be practiced. The appended drawings are incorporated herein and constitute a part of the description. The description includes specific details for the purpose of providing an understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

In light of the problems described above, users want to be able to use third party CAs for maintaining their public key infrastructure for use with their directory service because third party CAs may allow for reduced complexity (e.g., during setup), improved security (e.g., dedicated hardware-based security), and outsourced infrastructure maintenance (e.g., maintained by a cloud service provider).

Aspects of the subject technology offer approaches to addressing the challenges in compatibility between certain private CAs and directory services (e.g., managed and/or on-premises directory service environments). To improve security and customer experience, the connector (also referred to as an "intermediary service") may be a managed, drop-in certificate services replacement for directory services where the private CA can act as the issuance layer for certificates. To accomplish this, the connector may be compatible with specifications such as X.509 and other certificate enrollment protocols (e.g., MS-XCEP and MS-WSTEP). By running a private CA with the connector described herein, users may forgo specialized hardware or staff, reducing costs while improving security.

Figure 1:
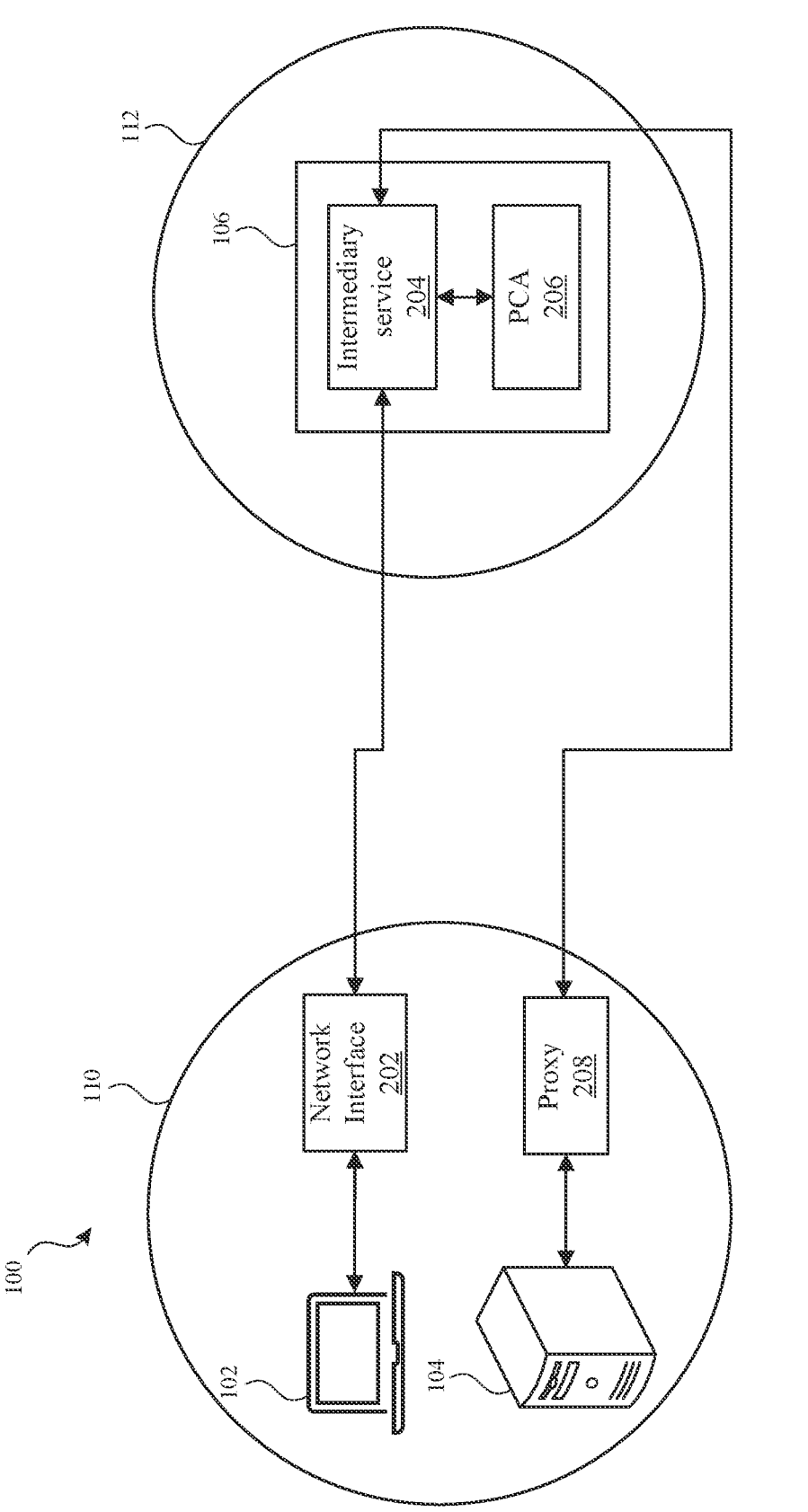
FIG. 1 illustrates a diagram of an example private CA system, in accordance with one or more embodiments of the subject technology.

FIG. 1 illustrates a diagram of an example private CA system 100, in accordance with one or more embodiments of the subject technology. Aspects of the system 100 may be discussed in further detail with respect to FIGS. 2-8. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The system 100 may generally include a plurality of computing devices and services that are interconnected to exchange data and resources with each other. A system 100 may include one or more computing devices, such as a computer 102, a server 104, and a server 106. The network may communicatively couple (directly or indirectly) the computer 102, the server 104, and/or the server 106. In one or more embodiments, the network may be an interconnected network of devices that may include, or may be communicatively coupled to, the internet. For explanatory purposes, the system 100 is illustrated in FIG. 1 as including the computer 102, the server 104, and the server 106; however, the system 100 may include any number of electronic devices and/or any number of servers communicatively coupled to each other directly or via the network.

The computer 102 may be a compute node and may include all or part of the electronic system discussed below with respect to FIGS. 7-8. The computer 102 may include hardware and/or software for generating one or more user interface elements (e.g., graphical user interfaces and/or command line interfaces) for providing to and/or receiving from the user information, such as directory service configurations, private CA configurations, virtual private cloud (VPC) configurations, and the like.

Figure 7:
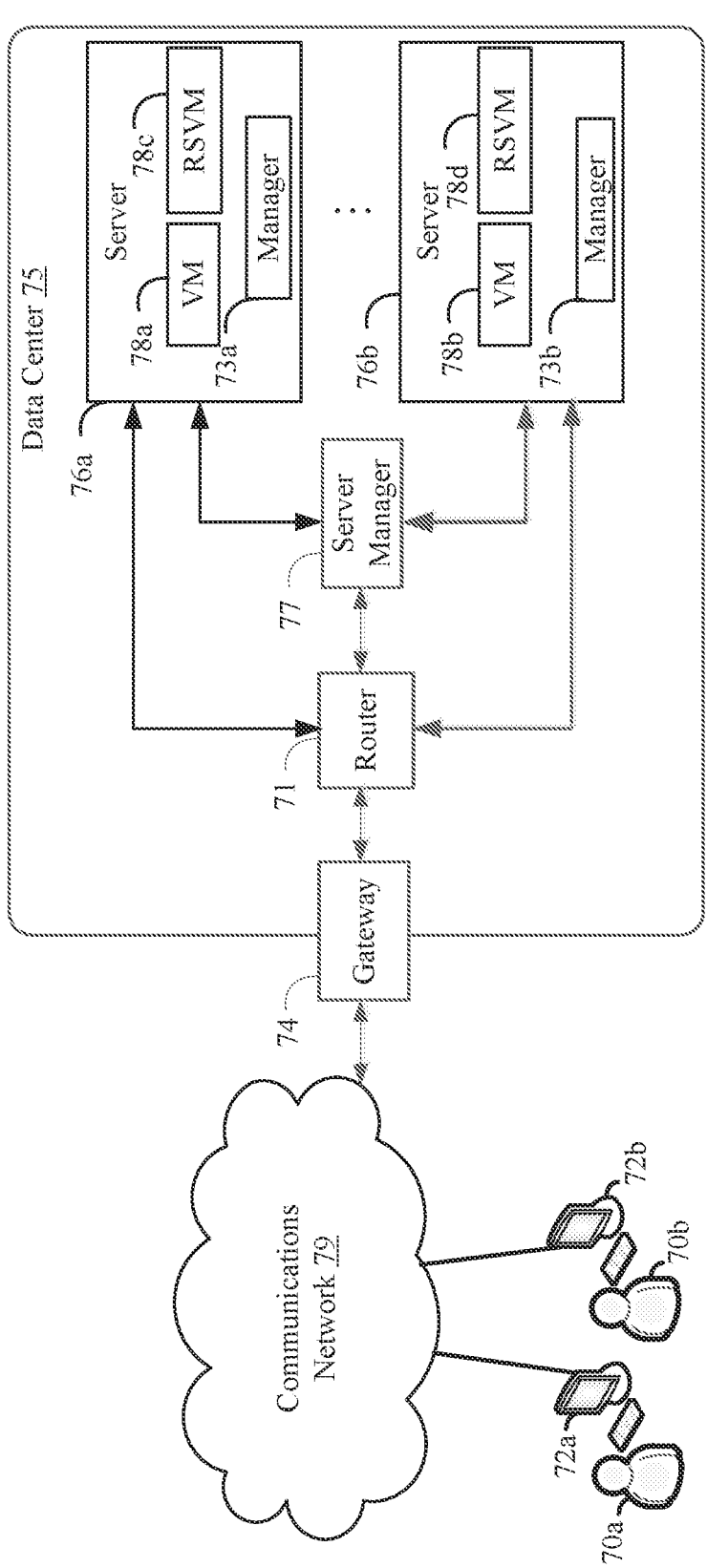
FIG. 7 illustrates an example computing environment in which aspects of the disclosed system may be used, in accordance with one or more embodiments of the subject technology.
Figure 8:
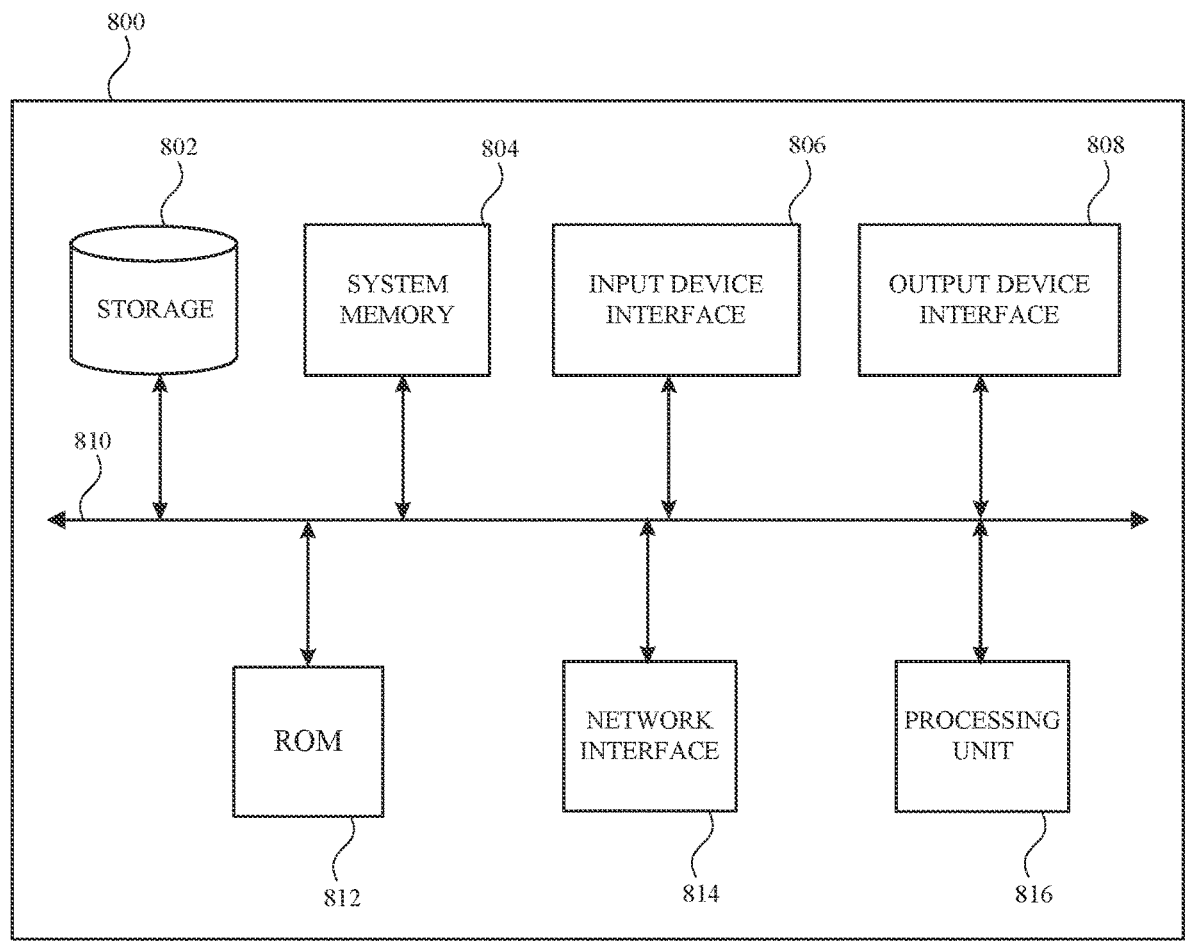
FIG. 8 illustrates an example electronic system in which aspects of the disclosed system may be used, in accordance with one or more embodiments of the subject technology.

The server 104 may be a set of one or more servers and may include all or part of the electronic system discussed with respect to FIGS. 7-8. Server 104 may comprise services and other computing features such as large scale storage or serverless processes supported by a cloud service. The server 104 may be a domain controller (DC) that runs one or more directory services and utilizes data stored in the one or more directories. Accordingly, the server 104 may include a storage component (e.g., memory, drives, and the like) to store one or more directories of a directory service. In some embodiments, each DC in a domain maintains a copy of a directory associated with a directory service and may synchronize data between each other. A DC may also be a global catalog server that stores a global catalog, which may include a read-only registry of objects (e.g., user, computer, printer, application, or any other type of resource with a corresponding set of attributes) in the domain's directory and a copy (e.g., partial copy) of objects in one or more other domains in the forest to facilitate searches for information about objects. A forest may be the highest level of the directory hierarchy, where objects in separate forests are not able to interact with each other unless the administrators of each of those forests establish trust between them.

The computer 102 and server 104 may be part of the same VPC 110. The VPC 110 may be a logically isolated and privately defined portion of a public cloud, such as Amazon Web Services (AWS). The VPC 110 may provide the ability to create a virtual network, complete with configurable subnets, routing tables, security policies, and the like. Within the VPC 110, directory services (e.g., Active Directory) may be provisioned and maintained in a virtualized environment, which may entail deploying domain controllers, DNS servers, and/or other directory-related components within the cloud infrastructure, such as within virtual machines or containers that may be run on server 104.

The server 106 may be a set of one or more servers and may include all or part of the electronic system discussed with respect to FIGS. 7-8. Server 106 may comprise cloud services and other computing features such as private CAs. The server 106 may be included in and/or manage a VPC 112. The VPC 112 (and similarly VPC 110) may include a control plane, which is responsible for making high-level decisions about how data traffic should be forwarded within the VPC. For example, the control plane may include functions such as routing, access control policies, and network management. The VPC 112 (and similarly VPC 110) may also include a data plane, which is responsible for the actual transmission and forwarding of data packets based on decisions made by the control plane. For example, the data plane may take the rules and policies established in the control plane and apply them to the data packets as they traverse the network. In some embodiments, the control plane and/or the data plane may be multi-tenant. That is, the control plane and/or the data plane may be designed to support and serve multiple tenants (e.g., users or VPCs) within the same VPC 112. Accordingly, VPC 112 may serve as a central, service VPC 112 that may run cloud services (e.g., private CA) for multiple VPCs, including VPC 110.

In some examples, all or part of the system 100 may be implemented as a cloud computing service an example of which employs a provider network described in more detail with respect to FIG. 7. Accordingly, a client device (e.g., the computer 102) may make an application programming interface (API) call to such a service (e.g., running on the server 104 and/or server 106) to perform one or more processes of the subject technology.

Figure 2:
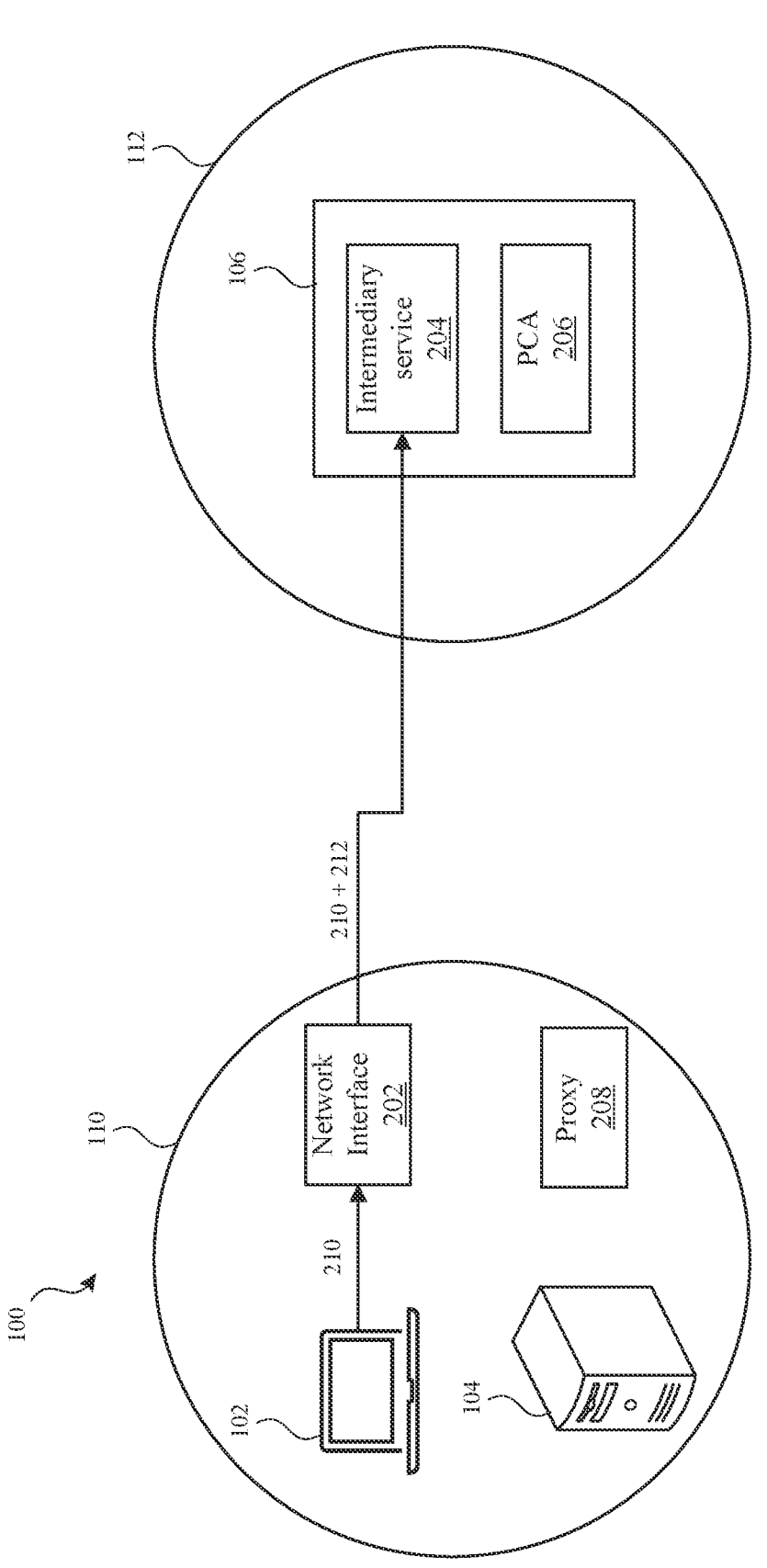
FIG. 2 illustrates an example communication with an intermediary service, in accordance with one or more embodiments of the subject technology.

FIG. 2 illustrates an example communication with an intermediary service 204, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The subject technology provides a cloud-based (rather than on-premises) intermediary service 204 between a private CA 206 running on server 106 and a directory service (e.g., Active Directory) running on server 104. To create an intermediary service 204 between a private CA 206 and domain controller of a directory service, network connectivity may be established between the service VPC 112 (which hosts the private CA 206) and the user VPC 110 (which hosts the user devices, such as computer 102, and domain controller running on server 104).

To request a certificate from the private CA 206 (e.g., during autoenrollment), the computer 102 may generate a request (e.g., an MS-XCEP/MS-WSTEP request) to the private CA 206 in the VPC 112. The request may be or may include a certificate signing request (CSR). The request may be sent via a VPC network interface 202 (210). The network interface 202 may be a virtual network interface that can be attached to, for example, a virtual machine instance within the user VPC 110, enabling communications (e.g., HTTP communications) between network interface instances, such as at the service VPC 112. In some embodiments, the communications between the network interfaces (e.g., between the user VPC 110 and the service VPC 112) may be over a private network connection such that no data is transmitted over the public internet.

When the network interface 202 receives the request, the request may be tagged with (e.g., modified by, included with, etc.) identifying information (212), such as a Proxy Protocol V2 (PPv2) packet. The identifying information may include metadata about a network connection (e.g., between the user VPC 110 and the service VPC 112 via the network interface 202) and/or the user VPC 110. In some embodiments, the identifying information may include information about the intermediary service 204, the server 104, and/or the VPC 112. The request may be passed through one or more load balancers, such as a network load balancer (e.g., at the VPC 112 before arriving at the server 106) and/or an application load balancer (e.g., at the server 106).

The server 106 (and/or network interface associated with the server 106 and the service VPC 112) may receive the request and the identifying information. Because the server 106 may be running one or more multi-tenant services, the identifying information may be used to identify the services relevant to the requestor. For example, the server 106 may identify an instance of an intermediary service 204 associated with the user VPC 110 based on the PPv2 packet. With the relevant intermediary service 204 identified, downstream applications (e.g., private CA 206) may provide responses tailored to the request.

Figure 3:
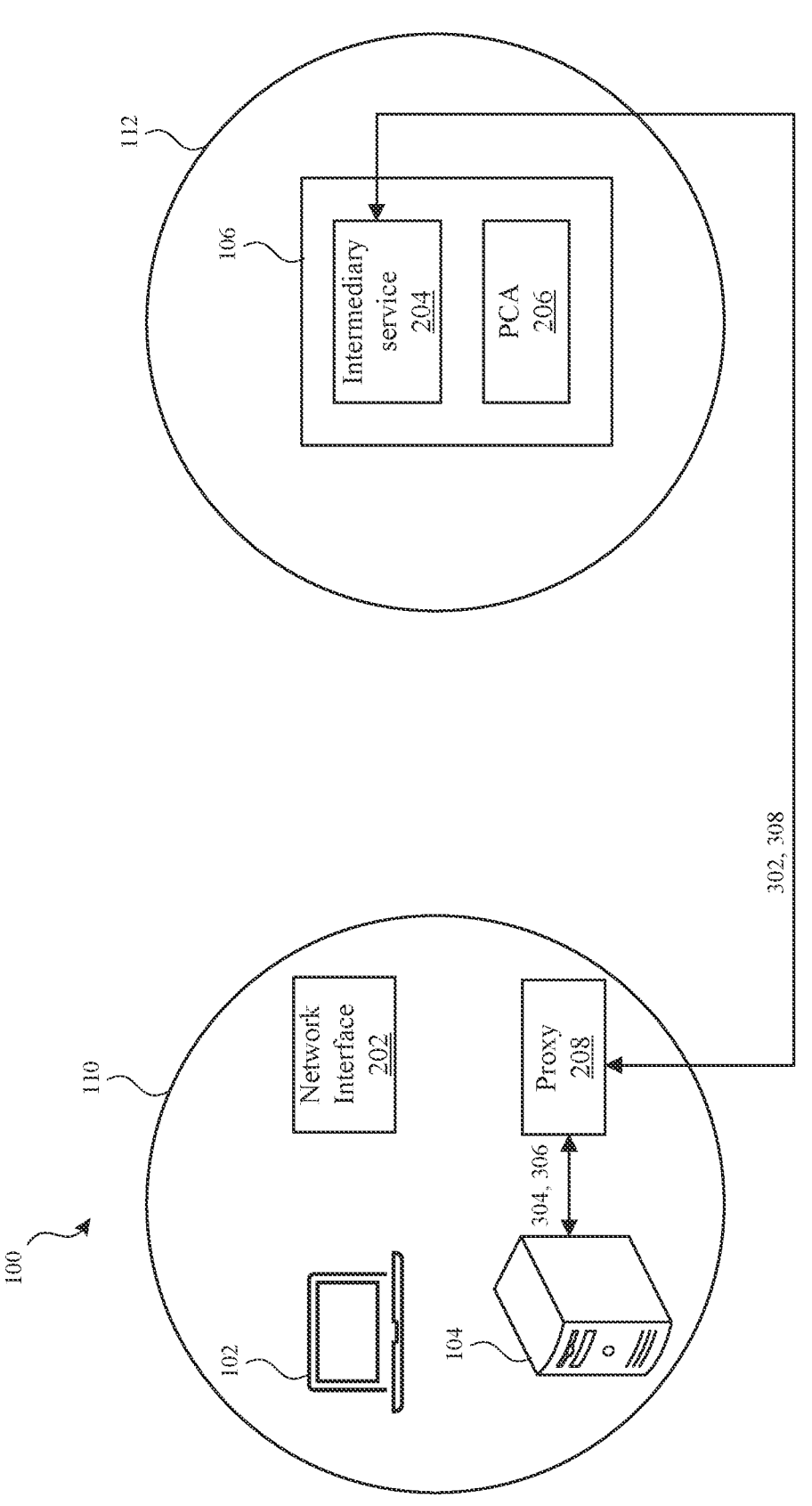
FIG. 3 illustrates an example communication with a proxy service, in accordance with one or more embodiments of the subject technology.

FIG. 3 illustrates an example communication with a proxy service, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

When the server 106 receives the request, the request may be passed to the intermediary service 204, and the intermediary service 204 may authenticate the request. In some embodiments, the request may include authentication information (e.g., credential, token, ticket, username and password, etc.), which may be generated by the domain controller. For example, when the server 106 is configured for Kerberos authentication, the authentication information may be a service ticket issued by the server 104. The service ticket may include a session key for the computer 102 and the intermediary service 204, which may be encrypted (e.g., via RC4, AES-128, or AES-256) with a key associated with the intermediary service 204. The intermediary service 204 may decrypt the service ticket with a corresponding secret key, thereby revealing the session key. The intermediary service 204 may use the session key to authenticate the request.

Authenticating the request may also or instead include validating the request, for example, to ensure that the request is properly formatted and contains any required information, such as subject name (e.g., domain name, IP address, or other identifier), public key (e.g., key for encrypting/decrypting communications), and signature algorithm (e.g., the algorithm used to sign the request).

Authenticating the request may also or instead include verifying the identity of the requester. The intermediary service 204 may verify the identity of the request by cross-referencing at least some information in the request with the directory service. Because the domain controller running the directory service is in a separate VPC, the intermediary service 204 may communicate with a proxy 208 in the user VPC 110 as a proxy for directly communicating with the domain controller (302). The proxy 208 may be responsible for authenticating with the domain controller, which may include querying the directory service of the domain controller with the information from the request (304) (e.g., the authentication information) and receiving a response from the directory service of the domain controller (306) (e.g., via one or more LDAP requests). The proxy 208 may return the results of the authentication to the intermediary service 204 (308). In some embodiments, the proxy 208 may be a WarpDrive agent that may establish a secure connection with the intermediary service 204 and provide access to directory service resources as if the intermediary service 204 was local to the directory service. In some embodiments, the proxy 208 may be installed on the server 104 (e.g., the domain controller).

Figure 4:
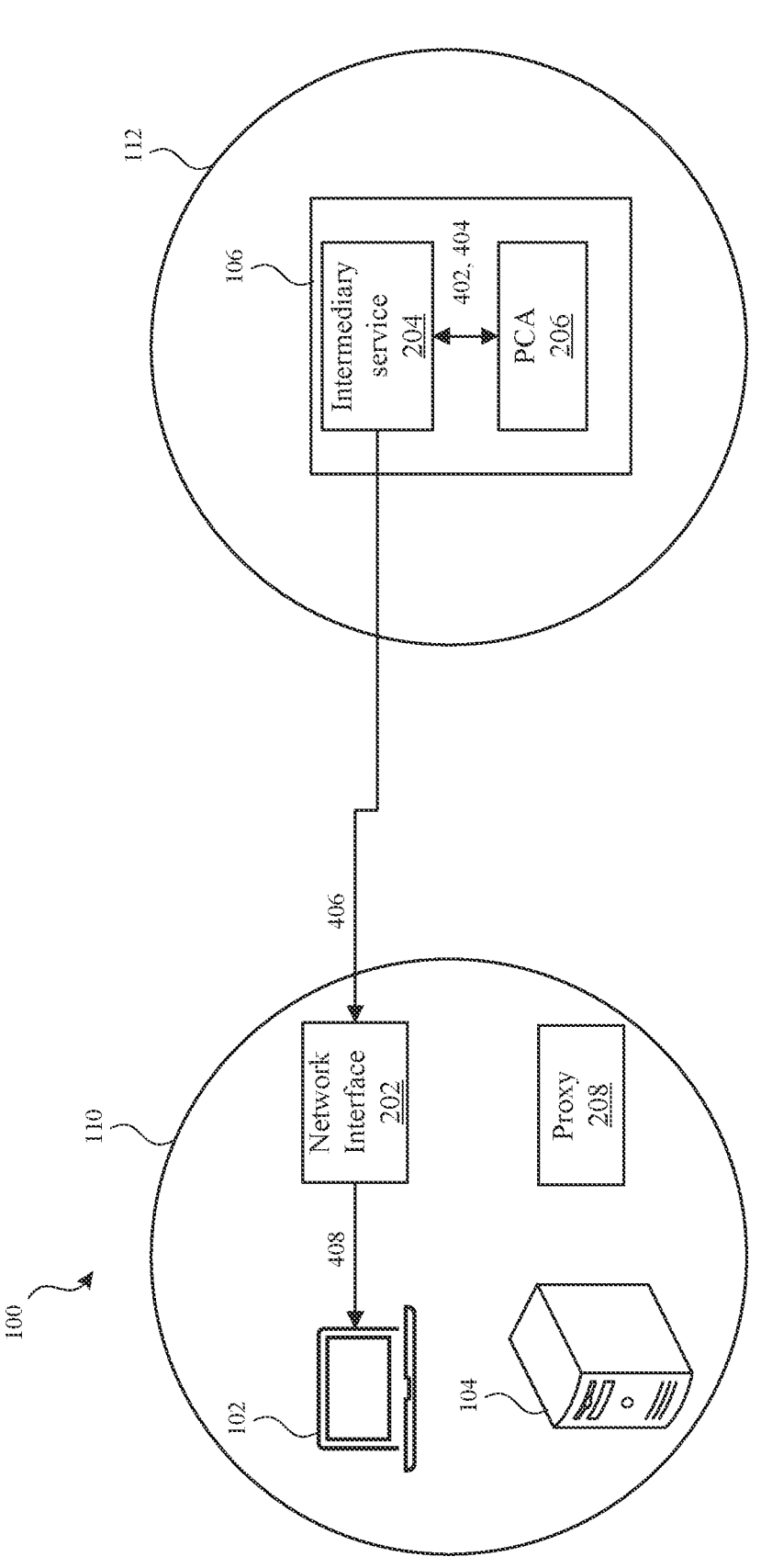
FIG. 4 illustrates an example certificate issuance, in accordance with one or more embodiments of the subject technology.

FIG. 4 illustrates an example certificate issuance, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

Once the request is authenticated, the intermediary service 204 may interact with the private CA 206 to fulfill the request. The intermediary service 204 may provide the request to the private CA 206 (402). The private CA 206 may use its secret key to generate the requested signed certificate. For example, the request may be a certificate signing request and the private CA 206 may use its private key to sign the request. The private CA 206 may then return the issued certificate to the intermediary service 204 (404).

In some embodiments, the private CA 206 may generate the certificate according to a certificate template. A certificate template may determine what properties the certificate should have. The request may include a name or other identifier to reference a certificate template. The private CA 206 may use the identifier to look up the certificate template. For example, the private CA 206 may look up the certificate template by querying the domain controller via the proxy 208. The private CA 206 may use the template to generate the signed certificate in a format according to the template.

With the signed certificate, the intermediary service 204 may prepare a response to the original request. The intermediary service 204 may send the response back to the computer 102 by providing the response to the VPC network interface 202 (406), and the VPC network interface 202 may pass the response to the computer 102 (408).

Figure 5A:
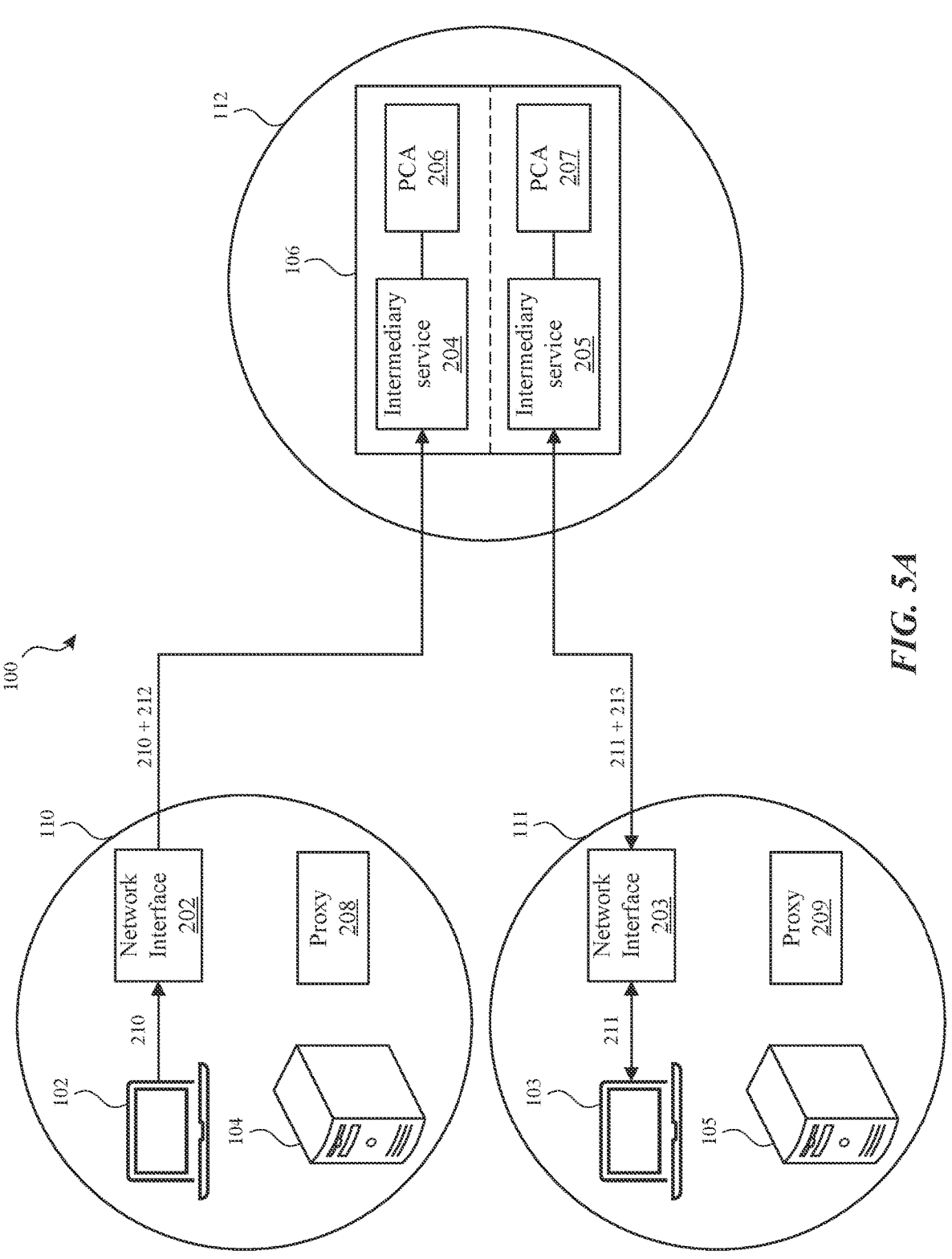
FIG. 5A illustrates a diagram of the example private CA system of FIG. 1 in a multi-tenant configuration, in accordance with one or more embodiments of the subject technology.

FIG. 5A illustrates a diagram of the example private CA system 100 in a multi-tenant configuration, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The server 106 may be configured for multi-tenant applications and thus may be designed to efficiently manage the simultaneous hosting of multiple independent users or tenants and their respective applications on a single physical infrastructure. A multi-tenant configuration may optimize resource utilization and cost-effectiveness while maintaining isolation and security between tenants (e.g., user VPC 110 and user VPC 111, belonging to separate users (e.g., organizations, individuals, or the like)).

The server 106 may include one or more physical servers (e.g., within a single server rack or cluster), each of which may be responsible for running one or more applications for different tenants (e.g., computer 102). Additionally or alternatively, the server 106 may utilize virtualization technologies where a physical server hosts multiple virtual machines with each virtual machine serving as an isolated environment for one or more tenants and their applications.

The server 106 may receive requests from the user VPC 110 (e.g., generated by the computer 102) and the user VPC 111 (e.g., generated by the computer 103). To distinguish between the requests, a respective network interface of a user VPC may include identifying information to identify services relevant to the user VPC. For example, the server 106 may identify an instance of an intermediary service 204 associated with the user VPC 110 based on identifying information 212 included with the request 210 by network interface 202. Similarly, the server 106 may identify an instance of an intermediary service 205 associated with the user VPC 111 based on identifying information 213 included with the request 211 by network interface 203. In some embodiments, the identifying information 212, 213 may include a VPC identifier, network interface identifier, requester identifier, username and/or password, destination identifier, service VPC identifier, intermediary service identifier, and/or the like.

With the relevant intermediary services identified, downstream applications may provide responses tailored to the appropriate requests. For example, once the server 106 can correlate the request 210 to the user VPC 110 based on identifying information 212, other applications (e.g., private CA 206) in the service VPC 112 can maintain the correlation and perform operations tailored to the request 210. Similarly, once the server 106 can correlate the request 211 to the user VPC 111 based on identifying information 213, other applications (e.g., private CA 207) in the service VPC 112 can maintain the correlation and perform operations (e.g., generate requests to the server 105 via the proxy 209) tailored to the request 211.

Although the intermediary services 204, 205 and private CAs 206, 207 are depicted as running on the same physical device, intermediary service 204 and private CA 206 may operate without knowledge of and/or interaction with intermediary service 205 and private CA 207. In some embodiments, a private CA (e.g., private CA 206) may be shared by multiple intermediary services (e.g., intermediary services 204, 205). Moreover, although the intermediary services 204, 205 and private CAs 206, 207 are depicted as running on the same physical device, it should be understood that any or all of intermediary services 204, 205 and private CAs 206, 207 may be run on separate physical or logical devices within one or more service VPC, such as service VPC 112.

Figure 5B:
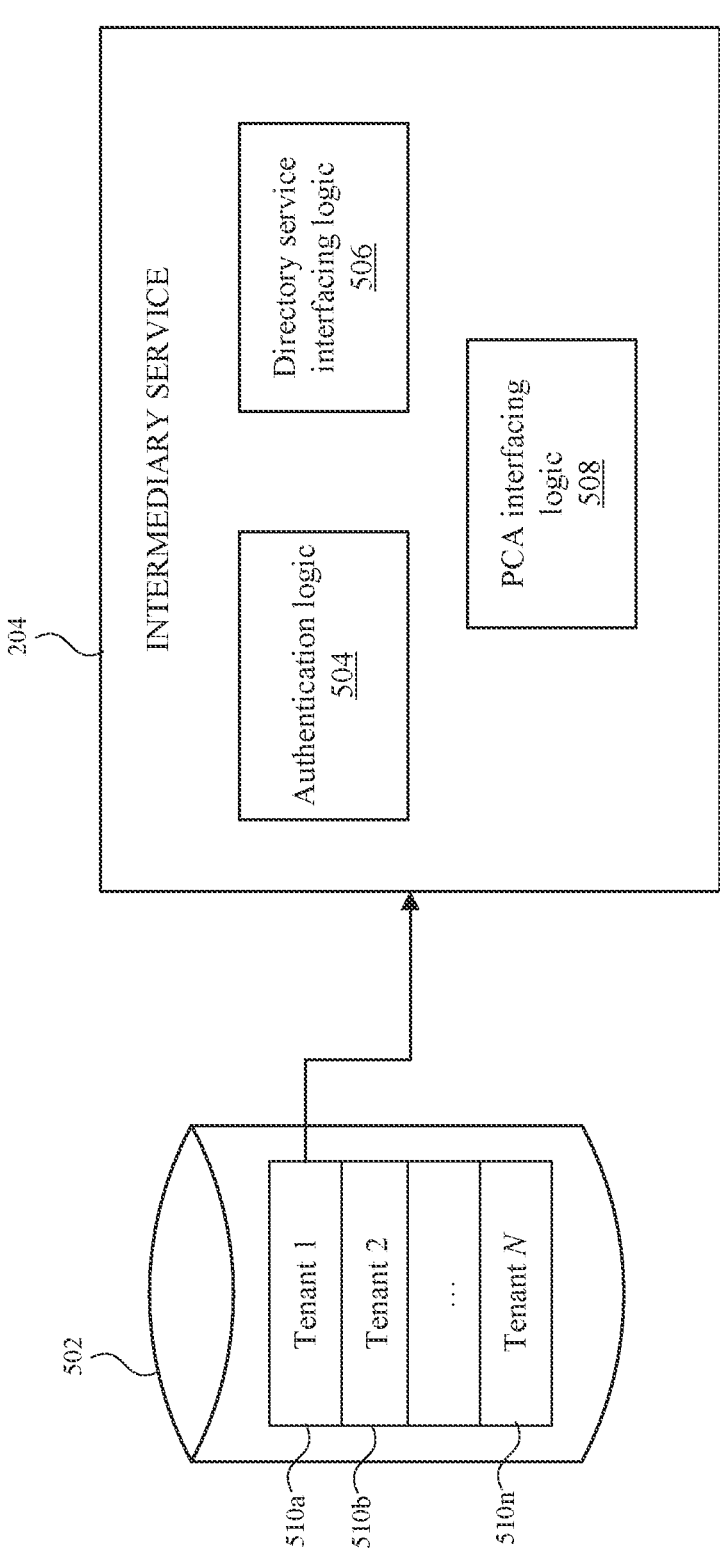
FIG. 5B illustrates a diagram of the example intermediary service, in accordance with one or more embodiments of the subject technology.

FIG. 5B illustrates a diagram of the intermediary service 204, in accordance with one or more embodiments of the subject technology. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

In one example, a database 502 (e.g., in service VPC 112) facilitates multitenancy in aspects of the subject technology, which allows the intermediary to service multiple tenants (e.g., users, organizations, groups, VPCs, etc.) to provide seamless access by tenants to services and physical and/or virtual resources while maintaining separation between the tenants.

In this example, the database 502 may include one or more tenant identifiers (e.g., identifier 510*a*, 510*b*, 510*n*). Each piece of data (e.g., files, services, applications, and the like) stored or operating within the VPC may be associated with a particular tenant (e.g., user VPC 110, 111). The tenant identifiers may be used to map tenants to their respective data. The tenant identifier may be included as part of a request made to a network interface of the VPC (e.g., the request 210 and identifying information 212). The term tenant identifier may refer to information for a tenant and information provided by that tenant that the intermediary can in turn use to derive other information specific to a tenant that is useful to service requests made by the tenant.

The intermediary service 204 may be running in a multitenant environment (e.g., the server 104) including the database 502. When the request 210 and identifying information 212 are received (e.g., by a network interface of the service VPC 112), the identifying information 212 may be passed to the database 502 for the database 502 to map the request 210 to the tenant identifier 510*a* thereby identifying the data associated with the identifying information 212, including the appropriate instance of the intermediary service (e.g., intermediary service 204).

The intermediary service 204 may include components such as authentication logic 504, directory service interfacing logic 506, private CA interface logic 508, and/or the like. Authentication logic 504 may include one or more software- and/or hardware-based components that may be used to verify the identity of the requestor. In some embodiments, the authentication logic 504 may be a username/password-based authentication, which may involve comparing the provided credentials against a stored (e.g., locally and/or remotely) set of usernames and their associated passwords. In some embodiments, the authentication logic 504 may be a network authentication protocol that uses tickets to prove the identity of users on a network. For example, the request 210 may include a ticket that may be validated by a key distribution center (e.g., the server 104), who confirms the ticket's validity, ensuring that the ticket has not been tampered with and that it was issued for the entity presenting the ticket. It should be understood that the authentication mechanisms described herein are mere examples and that other authentication mechanisms are contemplated.

Regardless of the authentication mechanism used, the authentication logic 504 may refer to one or more devices in a user VPC (e.g., user VPC 110) to complete the authentication. The directory service interfacing logic 506 may include one or more software- and/or hardware-based components that may be used to communicate with the directory service in a user VPC to facilitate the authentication. The directory service interface logic 506 may include one or more network interfaces that may be used to communicate with one or more proxies located in a user VPC (e.g., the proxy 208 in the user VPC 110). The one or more proxies may communicate with one or more devices within the respective VPC (e.g., the server 104) on behalf of the intermediary service 204.

Private CA interfacing logic 508 may include one or more software- and/or hardware-based components that may be used to communicate with a private CA (e.g., the private CA 206). The private CA interfacing logic 508 may include, for example, a set of protocols, methods, and/or rules that a service employs to communicate or otherwise interact with a private CA. The private CA interfacing logic 508 helps the intermediary service 204 request, validate, renew, and/or revoke digital certificates in a secure manner. The private CA interfacing logic 508 may include APIs or protocols that a private CA exposes. For example, the APIs or protocols may allow the intermediary service 204 to submit certificate signing requests (CSRs), check the status of a request, retrieve issued certificates, query the revocation status of a certificate, and the like. The private CA interfacing logic 508 may include, for example, error handling and/or response interpretation. For example, when a service sends a request to the private CA, the private CA may respond with a success message, an issued certificate, an error, a challenge that requires further verification, and/or the like. The private CA interfacing logic 508 may utilize the authentication logic 504. For example, before a service can request or manage certificates from the private CA, the service may provide its identity and its rights to perform the desired actions via the authentication logic 504, which may involve using API keys, client certifications, and/or any other authentication tokens.

FIG. 6 illustrates a flow diagram of an exemplary process 600 for issuing a certificate, in accordance with one or more embodiments of the subject technology. For explanatory purposes, the process 600 is primarily described herein with reference to FIGS. 1-5. However, the process 600 is not limited to the items shown in FIGS. 1-5, and one or more blocks (or operations) of the process 600 may be performed by one or more other components of other suitable devices. Further, for explanatory purposes, the blocks of the process 600 are described herein as occurring serially or linearly. However, multiple blocks of the process 600 may occur in parallel. In addition, the blocks of the process 600 need not be performed in the order shown and/or one or more blocks of the process 600 need not be performed and/or may be replaced by other operations.

In the process 600, at block 602, a service device (e.g., the server 106) may receive a request from a user device (e.g., the computer 102). When the user device (e.g., a device of one or more devices associated with a directory service) requires a digital certificate for authentication or encryption purposes, the user device may generate and send a request (e.g., a certificate signing request) to the service device, which may host the private CA. The request may include authentication information such as the user's identity, public key, and any relevant attributes or information for certificate issuance. The request may be formatted and/or delivered according to protocols such as MS-XCEP and/or MS-WSTEP. The request may also include service identity information for the service device to determine which services are associated with the request in a multi-tenant environment.

In some embodiments, the service device is in a service VPC (e.g., VPC 112) and the user device is in a user VPC (e.g., VPC 110). The service VPC and user VPC may be separate VPCs. The VPCs may be configured such that devices in one VPC may be able to communicate with devices in the other. To facilitate communication with other VPCs, a VPC may include one or more network interfaces. A network interface may include a virtualized networking component that connects and/or manages communications between resources within a cloud-based network (e.g., a VPC). For example, a network interface may be an ENI that serves as a software-defined network interface that can be embodied in one or more virtual machines, enabling data traffic to flow in and out of the associated VPC. In some embodiments, the request may be received by a service operating in a provider network comprising a plurality of tenants, where the user VPC may be a tenant of a plurality of tenants.

In some embodiments, one or more connections may be established between the user VPC and the service VPC before the user device can send the request to the service device. The first connection may be a network connection between the service VPC and the user VPC. A second connection may be a network connection between the intermediary service and the domain controller. Either or both network connections may be a private network connection that is a secure and isolated network link between different resources or environments within a cloud infrastructure that is separate from the public internet. Once the connections are established, the certificate chain may be obtained from the private CA (e.g., private CA 206) and provided to the directory of the domain controller to establish chain of trust, which may include a chain of certificates from the private CA to a certificate trusted by the domain controller.

At block 604, once the service device receives the request, the service device may pass the request to an intermediary service. The service device may be running one or more applications, containers, virtual machines, and/or any other services (e.g., the intermediary service 204 and the private CA 206), and may be multi-tenant, meaning that it may be running one or more services for one or more users. The service device may receive the request and forward it to the intermediary service associated with the user VPC. In some embodiments, the intermediary service may operate in the provider network.

Identifying the intermediary service associated with the user VPC may be based on information included in or otherwise associated with the request. For example, the request may have been generated by the user device to include an identifier (e.g., a name, address, and/or the like) that allows the service device to identify the relevant instance of the intermediary service. As another example, the request may have been sent by the network interface of the user VPC (e.g., the network interface 202) with an identifier that allows the service device to identify the relevant instance of the intermediary service. For example, the network traffic that includes the request may be prefixed with identifying information, such as a PPv2 packet, by the network interface of the VPC.

At block 606, once the intermediary service receives the request, the intermediary service may authenticate the request with a domain controller. The domain controller may be a server (e.g., the server 104) in the user VPC that runs a directory service that performs authentication, authorization, group management, policy administration, and the like, based on a directory including user permissions, credentials, and the like. The user VPC may also include a proxy service (e.g., the proxy 208) that is configured to communicate with the domain controller and to perform queries on the directory (e.g., LDAP queries).

To authenticate the request, the intermediary service may compare the authentication information of the request with user information stored in a directory of the domain controller. The intermediary service may perform the comparison by querying the directory via the proxy to authenticate the identity information of the request.

At block 608, after the request is successfully authenticated (e.g., the proxy indicates to the intermediary service that the identity information was successfully authenticated), the private CA may generate a signed certificate based on the request and the private key of the private CA.

At block 610, the signed certificate may be returned to the intermediary service, and the intermediary service may respond to the request of the user device with the signed certificate that is now associated with the user device.

FIG. 7 illustrates an example computing environment 700 in which aspects of the disclosed system may be used, in accordance with one or more embodiments of the subject technology. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as computer 72 or in the plural as computers 72) via a communications network 79. Data center 75 may be configured to provide computing resources for executing applications on a permanent or as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred to herein singularly as server 76 or in the plural as servers 76) that provide computing resources. These resources may be available as bare metal resources or as virtual machine instances 78a-b (which may be referred to herein singularly as virtual machine instance 78 or in the plural as virtual machine instances 78). In this example, the resources also include distribution and modification virtual machines (DMVM's) 79a-b, which are virtual machines that are configured to execute any, or all, of the dynamic messaging group distribution and modification techniques described above. In some examples, the server 104 may be a VM 78a.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring still to FIG. 7, the network 79 may, for example, be a publicly accessible network of linked networks and possibly operated by various distinct parties, such as the internet. In other embodiments, communications network 79 may be a private network, such as a corporate or university network that is wholly or partially inaccessible to non-privileged users. In still other embodiments, communications network 79 may include one or more private networks with access to and/or from the internet.

Communication network 79 may provide access to computers 72. User computers 72 may be computers utilized by users 70 or other customers of data center 75. For instance, user computer 72a or 72b may be a server, a desktop or laptop personal computer, a tablet computer, a wireless telephone, a personal digital assistant (PDA), an e-book reader, a game console, a set top box or any other computing device capable of accessing data center 75. User computer 72a or 72b may connect directly to the internet (e.g., via a cable modem or a Digital Subscriber Line (DSL)). In some examples, the computer 102 may be a user computer 72a. Although only two user computers 72a and 72b are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73a or 73b (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of embodiments can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76a and 76b. Router 71 may also be connected to gateway 74, which is connected to communications network 79. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a server manager 77 is also employed to at least in part direct various communications to, from and/or between servers 76a and 76b. While FIG. 7 depicts router 71 positioned between gateway 74 and server manager 77, this is merely an exemplary configuration. In some cases, for example, server manager 77 may be positioned between gateway 74 and router 71. Server manager 77 may, in some cases, examine portions of incoming communications from user computers 72 to determine one or more appropriate servers 76 to receive and/or process the incoming communications. Server manager 77 may determine appropriate servers to receive and/or process the incoming communications based on factors such as an identity, location, or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 77 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other embodiments might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, internet appliances, television-based systems (e.g., using set top boxes and/or personal/digital video recorders) and various other consumer products that include appropriate communication capabilities.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned differently) without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

FIG. 8 illustrates an example electronic system 800 in which aspects of the system may be used, in accordance with one or more embodiments of the subject technology. The electronic system 800 may be, and/or may be a part of, a computing device (e.g., computer 102 and/or server 104). The electronic system 800 may include various types of computer-readable media and interfaces for various other types of computer-readable media. The electronic system 800 may include a bus 810, a storage device 802, a system memory 804, an input device interface 806, an output device interface 808, a ROM 812, a network interface 814, and a processing unit 816, or subsets and variations thereof. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

Network interface 814 may be configured to allow data to be exchanged between the electronic system 800 and devices attached to a network or networks (e.g., communications network 79), such as other computer systems or devices. In various embodiments, network interface 814 may support communication via any suitable wired or wireless general data networks, such as types of Ethernet networks, for example. Additionally, network interface 814 may support communication via telecommunications/telephony networks, such as analog voice networks or digital fiber communications networks, via storage area networks such as Fiber Channel SANs (storage area networks) or via any other suitable type of network and/or protocol.

The bus 810 collectively represents all system, peripheral, and chipset buses that communicatively connect the numerous internal devices of the electronic system 800. In one or more embodiments, the bus 810 communicatively connects the processing unit 816 with the other components of the electronic system 800 (e.g., the ROM 812, the system memory 804, and the persistent storage device 802). From various memory units, the processing unit 816 retrieves instructions to execute and data to process in order to execute the operations of the subject disclosure. The processing unit 816 may be a controller and/or a single- or multi-core processor or processors in various embodiments.

The ROM 812 may store static data and instructions that are needed by the one or more processing unit(s) 816 and other modules of the electronic system 800. The storage device 802, on the other hand, may be a read-and-write memory device. The storage device 802 may be a non-volatile memory unit that stores instructions and data (e.g., static and dynamic instructions and data) even when the electronic system 800 is off. Data may include one or more long-term data stores (e.g., databases). In one or more embodiments, a mass-storage device (such as a magnetic or optical disk and its corresponding disk drive) may be used as the storage device 802. In one or more embodiments, a removable storage device (such as a flash drive, and its corresponding disk drive) may be used as the storage device 802. Generally speaking, a computer-accessible medium may include non-transitory storage media or memory media, such as magnetic or optical media.

Like the storage device 802, the system memory 804 may be a read-and-write memory device. However, unlike the storage device 802, the system memory 804 may be a volatile read-and-write memory, such as random-access memory. The system memory 804 may store any of the instructions and data that one or more processing unit 816 may need at runtime to perform operations. Data may include one or more short-term data stores (e.g., caches and buffers). In one or more embodiments, the processes of the subject disclosure are stored in the system memory 804 and/or the storage device 802. From these various memory units, the one or more processing unit 816 retrieves instructions to execute and data to process in order to execute the processes of one or more embodiments, discussed below.

Embodiments within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general-purpose or special-purpose computing device, including any processing electronics and/or processing circuitry capable of executing instructions. For example, without limitation, the computer-readable medium may include any transitory semiconductor memory (e.g., the system memory 804), such as RAM, DRAM, SRAM, T-RAM, Z-RAM, and TTRAM. The computer-readable medium also may include any non-transitory semiconductor memory (e.g., the storage device 802), such as ROM, SSD, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more embodiments, the tangible computer-readable storage medium may be directly coupled to a computing device, while in other embodiments, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

The bus 810 also connects to the input device interface 806 and output device interface 808. The input device interface 806 enables the system to receive inputs. For example, the input device interface 806 allows a user to communicate information and select commands on the electronic system 800. The input device interface 806 may be used with input devices such as keyboards, mice, dials, switches, sliders, and other interfaces (physical or virtual) for a user to supply information to the electronic system 800. The output device interface 808 may be used with output devices such as displays, speakers, and other interfaces (physical or virtual) for the computing electronic system 800 to provide information. One or more embodiments may include devices that function as both input and output devices, such as a touchscreen.

The bus 810 also couples the electronic system 800 to one or more networks and/or to one or more network nodes through the network interface 814. The network interface 814 may include one or more interfaces that allow the electronic system 800 to be a part of a network of computers (e.g., a local area network (LAN), a wide area network (WAN), or a network of networks (the internet)). For example, the network interface 814 may include a network interface card (NIC).

A network set up by an entity, such as a company or a public sector organization, to provide one or more web services (such as various types of cloud-based computing or storage) accessible via the internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some embodiments; in other embodiments, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some embodiments inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

The predicate words "configured to," "operable to," and "programmed to" do not imply any particular tangible or intangible modification of a subject but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, which applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

What is claimed is:

1. A method, comprising:
   receiving, by a service operating in a provider network comprising a plurality of tenants, a request from a user device of one or more user devices in a user virtual private cloud (VPC) of a first tenant of the plurality of tenants, wherein the request includes service identity information and authentication information;
   providing, by the service, the request to an intermediary service operating in the provider network, wherein the intermediary service associates the service identity information with information maintained by the intermediary service associated with the tenants;
   authenticating, by the intermediary service and with a domain controller, the request based on the authentication information;
   after the request is successfully authenticated, generating, by a private certificate authority (PCA) in a service VPC separate from the user VPC, a certificate based on the request; and
   providing, by the service, the certificate to the user device.

2. The method of claim 1, further comprising, before receiving the request:
   generating a private network connection between the service VPC and the user VPC based on private network credentials provided by the user device;
   generating a domain controller connection between the intermediary service and the domain controller based on domain controller credentials stored by the intermediary service; and
   providing, from the PCA to the domain controller, a certificate chain to establish trust between the PCA and the domain controller based on the certificate chain.

3. The method of claim 1, wherein the service VPC includes a plurality of intermediary services including the intermediary service, wherein each of the plurality of intermediary services is associated with a tenant including the user VPC.

4. The method of claim 3, further comprising, after receiving the request:
   identifying, by the service, the intermediary service from the plurality of intermediary services based on the service identity information of the request.

5. The method of claim 1, wherein authenticating the request comprises:
   generating a domain controller connection between the intermediary service and the domain controller via a proxy service; and verifying, with the domain controller and via the proxy service, the authentication information of the request for authenticating the request.

6. A system, comprising:
   at least one compute node operating in a provider network, the compute node configured to perform operations comprising:
   receiving, by a service device, a request from a user device of one or more user devices in a user virtual private cloud (VPC), the request including service identity information and authentication information;
   providing, by the service device, the request to an intermediary service, the intermediary service associated with the service identity information;
   authenticating, by the intermediary service and with a domain controller, the request based on the authentication information;
   after the request is successfully authenticated, generating, by a private certificate authority (PCA), a certificate based on the request; and
   providing, by the service device, the certificate to the user device.

7. The system of claim 6, wherein the intermediary service and the PCA are in a service VPC separate from the user VPC.

8. The system of claim 7, wherein the at least one compute node is configured to perform operations further comprising, before receiving the request:
   generating a private network connection between the service VPC and the user VPC based on private network credentials provided by the user device;
   generating a domain controller connection between the intermediary service and the domain controller based on domain controller credentials stored by the intermediary service; and
   providing, from the PCA to the domain controller, a certificate chain to establish trust between the PCA and the domain controller based on the certificate chain.

9. The system of claim 6, wherein the service VPC includes a plurality of intermediary services including the intermediary service.

10. The system of claim 9, wherein the at least one compute node is configured to perform operations further comprising, after receiving the request:
   identifying, by the service device, the intermediary service from the plurality of intermediary services based on the service identity information of the request.

11. The system of claim 6, wherein the service device comprises one or more of the intermediary service or the PCA.

12. The system of claim 6, wherein authenticating the request comprises:
   generating a domain controller connection between the intermediary service and the domain controller via a proxy service; and
   verifying, with the domain controller and via the proxy service, the authentication information of the request for authenticating the request.

13. The system of claim 12, wherein the proxy service and the domain controller are in the user VPC.

14. A non-transitory computer-readable medium, comprising:
   one or more instructions that, when executed by one or more processors, cause the one or more processors to perform operations comprising:
   receiving a request from a user device of one or more user devices in a user virtual private cloud (VPC), the request including service identity information and authentication information;

providing the request to an intermediary service of a plurality of intermediary services, the intermediary service associated with the service identity information;

authenticating, using the intermediary service and with a domain controller, the request based on the authentication information;

after the request is successfully authenticated, generating, by a private certificate authority (PCA), a certificate based on the request; and providing the certificate to the user device.

15. The non-transitory computer-readable medium of claim 14, wherein the one or more instructions cause the one or more processors to perform operations further comprising, before receiving the certificate request:

generating a private network connection between a service VPC and the user VPC based on private network credentials provided by the user device wherein the service VPC includes a plurality of intermediary services including the intermediary service;

generating a domain controller connection between the intermediary service and the domain controller based on domain controller credentials stored by the intermediary service; and providing, from the PCA to the domain controller, a certificate chain to establish trust between the PCA and the domain controller based on the certificate chain.

16. The non-transitory computer-readable medium of claim 14, wherein the service VPC includes a plurality of intermediary services including the intermediary service.

17. The non-transitory computer-readable medium of claim 16, wherein the one or more instructions cause the one or more processors to perform operations further comprising, after receiving the request:

identifying the intermediary service from the plurality of intermediary services based on the service identity information of the request.

18. The non-transitory computer-readable medium of claim 14, wherein the intermediary service and the PCA are running on the same device.

19. The non-transitory computer-readable medium of claim 14, wherein authenticating the request comprises:

generating a domain controller connection between the intermediary service and the domain controller via a proxy service; and verifying, with the domain controller and via the proxy service, the authentication information of the request for authenticating the request.

20. The non-transitory computer-readable medium of claim 19, wherein the proxy service and the domain controller are in the user VPC.

* * * * *